US011134252B2

(12) United States Patent
Kudana et al.

(10) Patent No.: US 11,134,252 B2
(45) Date of Patent: Sep. 28, 2021

(54) MULTI-PASS VIDEO ENCODING

(71) Applicant: Texas Instruments Incorporated, Dallas, TX (US)

(72) Inventors: Arun Shankar Kudana, Bangalore (IN); Soyeb Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/911,984

(22) Filed: Jun. 25, 2020

(65) Prior Publication Data

US 2020/0329249 A1 Oct. 15, 2020

Related U.S. Application Data

(63) Continuation of application No. 16/038,975, filed on Jul. 18, 2018, now Pat. No. 10,735,751, which is a continuation of application No. 14/989,825, filed on Jan. 7, 2016, now Pat. No. 10,063,866.

(60) Provisional application No. 62/100,562, filed on Jan. 7, 2015.

(51) Int. Cl.
*H04N 19/194* (2014.01)
*H04N 19/11* (2014.01)
*H04N 19/114* (2014.01)
*H04N 19/142* (2014.01)
*H04N 19/159* (2014.01)
*H04N 19/176* (2014.01)
*H04N 19/593* (2014.01)
*H04N 19/573* (2014.01)

(52) U.S. Cl.
CPC ........... *H04N 19/194* (2014.11); *H04N 19/11* (2014.11); *H04N 19/114* (2014.11); *H04N 19/142* (2014.11); *H04N 19/159* (2014.11); *H04N 19/176* (2014.11); *H04N 19/573* (2014.11); *H04N 19/593* (2014.11)

(58) Field of Classification Search
CPC .... H04N 19/194; H04N 19/114; H04N 19/11; H04N 19/142; H04N 19/159; H04N 19/176; H04N 19/593; H04N 19/573
See application file for complete search history.

(56) References Cited

U.S. PATENT DOCUMENTS

| | | | |
|---|---|---|---|
| 5,144,424 A | 9/1992 | Savatier | |
| 6,552,674 B2 | 4/2003 | Cheung et al. | |
| 6,804,301 B2 * | 10/2004 | Wu | H04N 19/503 348/700 |
| 6,961,376 B2 * | 11/2005 | Wu | H04N 19/172 375/240.12 |

(Continued)

*Primary Examiner* — Dramos Kalapodas
(74) *Attorney, Agent, or Firm* — Ebby Abraham; Charles A. Brill; Frank D. Cimino

(57) ABSTRACT

Systems, methods and computer readable mediums are presented for encoding a stream of input video frames, in which the input video frames are down sampled and the down sampled frames are encoded in a first encoding pass to generate a set of first pass coded frames forming a single first pass I frame and a plurality of first pass P frames formed into first pass sub-groups of pictures (SUB-GOPs). First pass encoding statistics are generated for individual first pass SUB-GOPs, and the statistics are used to encode the input video frames in a second encoding pass to generate a set of second pass coded frames.

21 Claims, 13 Drawing Sheets

(56) References Cited

U.S. PATENT DOCUMENTS

| | | | |
|---|---|---|---|
| 7,251,275 B2 * | 7/2007 | Wu | H04N 21/23608 |
| | | | 375/240.03 |
| 8,031,777 B2 | 10/2011 | Haskell et al. | |
| 8,116,371 B2 | 2/2012 | Shima | |
| 8,121,194 B2 | 2/2012 | Shima | |
| 8,160,136 B2 | 4/2012 | Sezer | |
| 8,160,144 B1 | 4/2012 | Varadarajan et al. | |
| 8,165,202 B1 | 4/2012 | Yonemoto et al. | |
| 8,175,147 B1 | 5/2012 | Webb et al. | |
| 8,213,511 B2 | 7/2012 | Swami et al. | |
| 8,213,515 B2 | 7/2012 | Kudana et al. | |
| 8,223,836 B2 | 7/2012 | Wu et al. | |
| 9,929,983 B2 | 3/2018 | Ellis et al. | |
| 2002/0186154 A1 | 12/2002 | Cheung et al. | |
| 2003/0103566 A1 | 6/2003 | Stenzel | |
| 2003/0128761 A1 | 7/2003 | Zhou | |
| 2004/0017852 A1 | 1/2004 | Garrido et al. | |
| 2005/0036544 A1 | 2/2005 | Webb et al. | |
| 2007/0019740 A1 | 1/2007 | Budagavi | |
| 2007/0140344 A1 | 6/2007 | Shima | |
| 2007/0211950 A1 | 9/2007 | Shima | |
| 2007/0230565 A1 * | 10/2007 | Tourapis | H04N 19/109 |
| | | | 375/240.01 |
| 2008/0063080 A1 | 3/2008 | Madumbu et al. | |
| 2009/0016631 A1 | 1/2009 | Naito et al. | |
| 2010/0098166 A1 | 4/2010 | Budagavi et al. | |
| 2010/0215104 A1 | 8/2010 | Osamoto et al. | |
| 2012/0183080 A1 | 7/2012 | Zhou | |
| 2012/0236940 A1 | 9/2012 | Katzur et al. | |
| 2012/0263231 A1 | 10/2012 | Zhou | |
| 2013/0230095 A1 | 9/2013 | Mathew et al. | |
| 2014/0119436 A1 | 5/2014 | Mathew et al. | |
| 2014/0161172 A1 * | 6/2014 | Wang | H04N 19/42 |
| | | | 375/240.01 |

\* cited by examiner

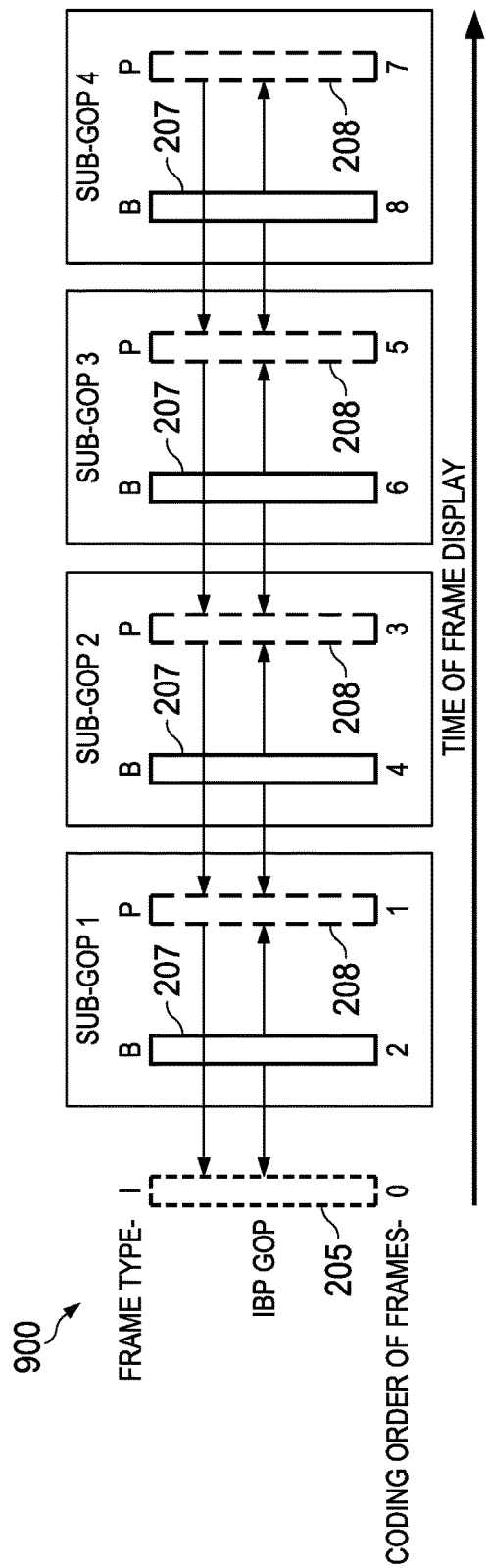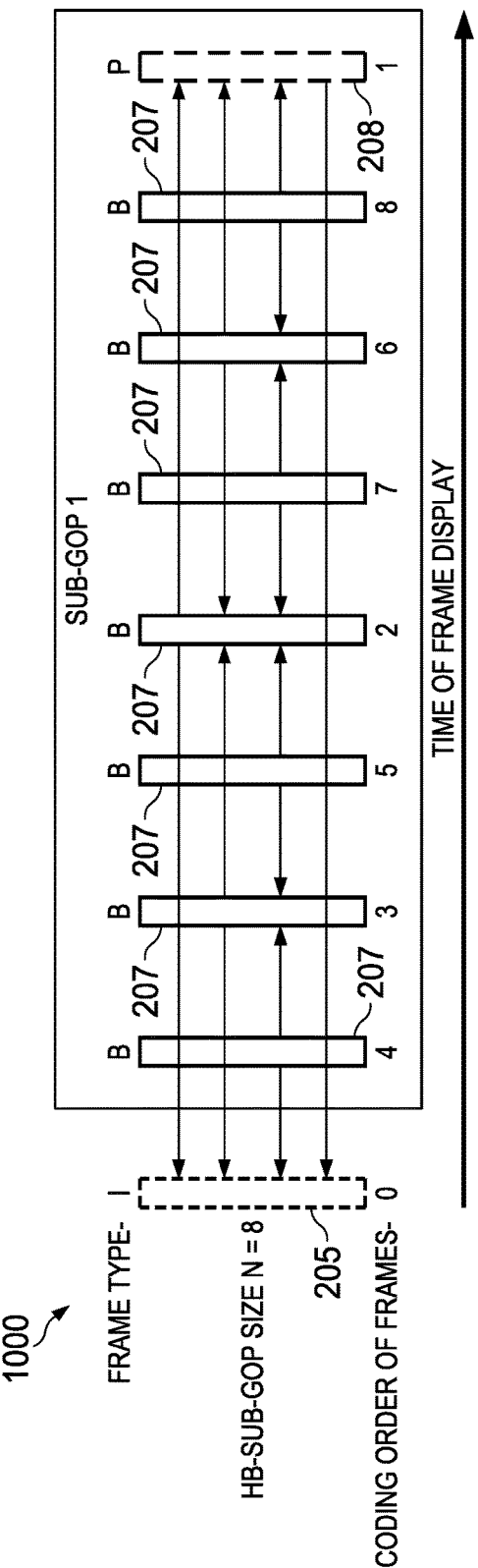
FIG. 9
FIG. 10

| | EXAMPLE-1 | EXAMPLE-2 | EXAMPLE-3 |
|---|---|---|---|
| THE 4 BFrameSuitableFlags GENERATED FOR 8 FRAMES OF THE SET (INPUT TO STEP 3) | TRUE, TRUE, TRUE, TRUE | FALSE, FALSE, FALSE, FALSE | TRUE, TRUE, FALSE, TRUE |
| | ↓ | ↓ | ↓ |
| FRAME TYPES THAT ARE MARKED FOR THE 8 FRAMES OF THE SET (HB OR P) | HB-HB, HB-HB, HB-HB, HB-HB | P-P, P-P, P-P, P-P | HB-HB, HB-HB, P-P, HB-HB |
| FINAL CODING TYPE THAT IS USED FOR EACH FRAME OF THE SET | B-B B-B B-B B-P (HBGOP8) | P-P P-P P-P P-P (ALL P FRAMES) | B-B B-B-P P-P B-P (HBGOP4 + P + P + HBGOP2) |

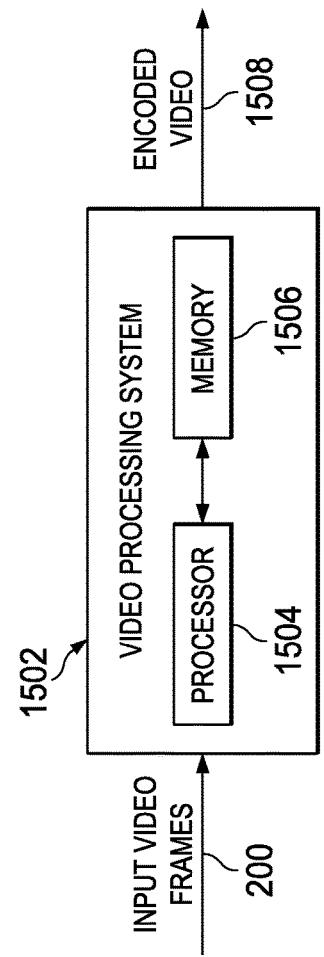

FIG. 15

MULTI-PASS VIDEO ENCODING

CROSS-REFERENCE TO RELATED APPLICATIONS

This application is a continuation of U.S. patent application Ser. No. 16/038,975, filed Jul. 18, 2018, which is a continuation of U.S. patent application Ser. No. 14/989,825, filed Jan. 7, 2016 (now U.S. Pat. No. 10,063,866), which application claims priority to and the benefit of U.S. provisional patent application No. 62/100,562, filed Jan. 7, 2015, all of which are incorporated herein by reference.

BACKGROUND

Video coding or compression is used in a variety of applications to reduce the amount of memory and/or bandwidth needed to store or transmit a stream of video pictures or frames. Single pass and multi-pass video encoding techniques and apparatuses have been developed, the former providing fast encoding and the latter facilitating higher-quality coded video. In general, single pass coding encodes a given frame based on previous video data in a sequence of video frames. Single pass encoders do not ensure good video quality since the encoder cannot predict what kind of input will be encountered in the future. Thus, the single pass encoding approach suffers from diminished quality encoded video when the nature of the video content is changing. The multi-pass approach involves encoding the video repeatedly such that one video encoding pass generates data that is used by a subsequent encoding pass, and the compressed video output stream is generated by the final encoding pass. However, multi-pass encoding suffers from many shortcomings, particularly for real time applications. First, multi-pass encoding suffers from increased computational complexity, where dual-pass encoding is typically more than twice the cost of single pass encoding in terms of encoding time, processing resources and memory requirements. As a result, many multi-pass encoders are not suitable for real time systems where encoding has to be at least as fast as the input video, typically 30 to 60 frames per second (fps).

SUMMARY

Disclosed examples include systems, methods and computer readable mediums for encoding a video stream. Input frames are down sampled and encoded in a first encoding pass to generate statistics for use in a second encoding pass. Disclosed examples use IPP encoding in the first pass and IBP encoding in a second pass and any subsequent passes. In certain examples, encoding in the first and second passes is done for sub-groups of pictures (SUB-GOPs), with the second pass encoding using statistics from the first pass to facilitate use of a single encoder. The first encoding pass generates a set of first pass coded frames forming a single I frame and a plurality of P frames formed into first pass SUB-GOPs, and statistics from the first pass are generated for individual first pass SUB-GOPs. The first pass SUB-GOP statistics are used to encode the corresponding second pass SUB-GOP to generate second pass coded frames. Further encoding passes can be used in certain implementations. In certain examples, the first pass statistics include one or more picture or frame-level statistics and/or macro block level statistics. In certain examples, motion vectors are computed for the first pass frames, and these are scaled to account for the first pass down sampling and used to compute global motion vectors in the second pass encoding. In certain examples, the scaled first pass motion vector information is used as a seed predictor for motion estimation in the second pass. In certain examples, the first pass is used to identify scene changes to selectively adjust SUB-GOP boundaries in the second pass. In various examples, one or more metrics are computed in the first encoding pass and are used to determine the number of frames in the second pass SUB-GOPs.

BRIEF DESCRIPTION OF THE DRAWINGS

FIG. 9 is a diagram of IBP-coded SUB-GOPs with a SUB-GOP size N=2.

FIG. 10 is a diagram of an IBP-coded SUB-GOP with a SUB-GOP size N=8.

FIG. 14 is a diagram of B frame suitability analysis.

FIG. 15 is a diagram of a video processing system.

DETAILED DESCRIPTION OF EXAMPLE EMBODIMENTS

Figure 1:
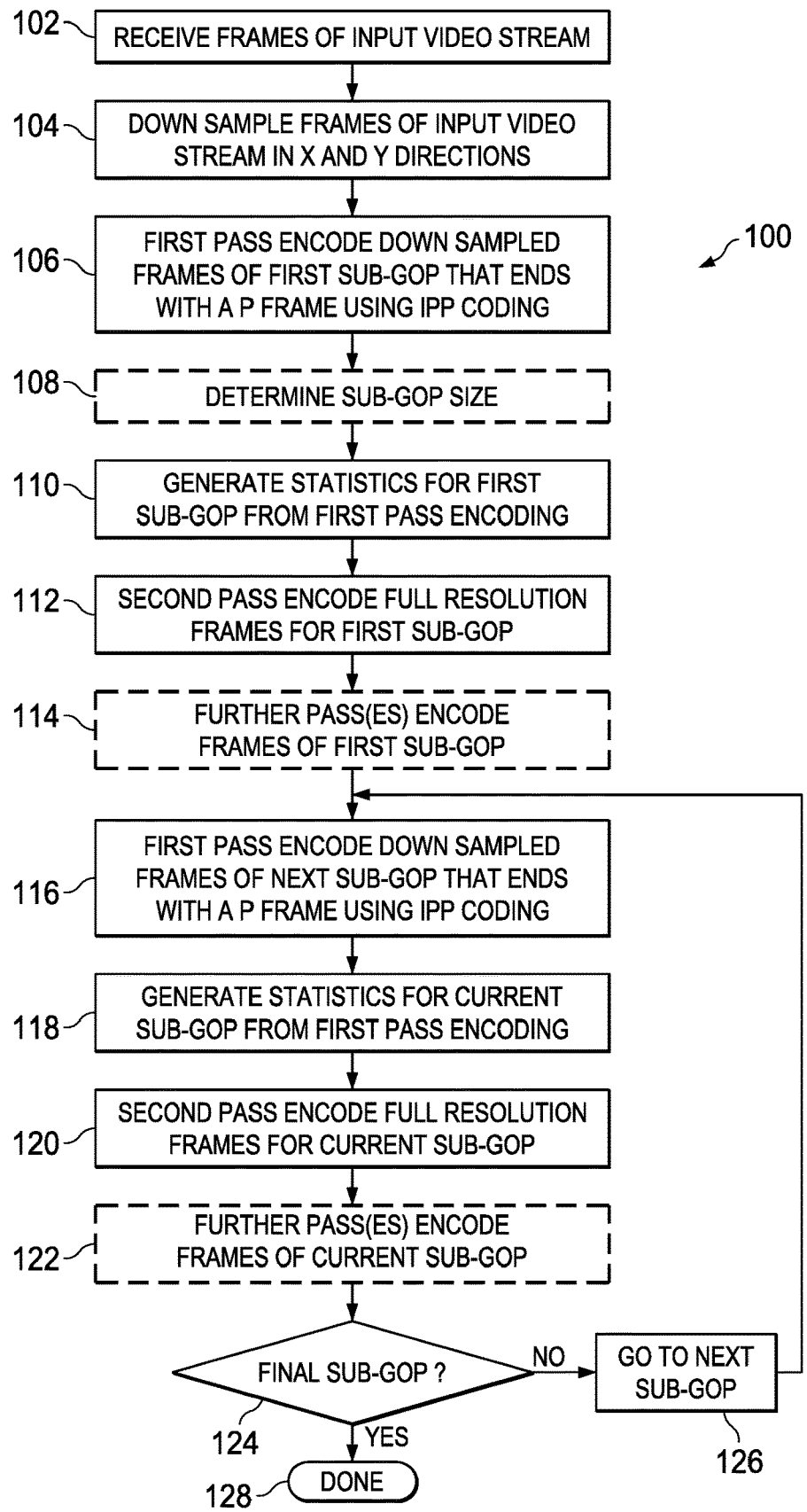
FIG. 1 is a flow diagram of a video encoding method.

In the drawings, like reference numerals refer to like elements throughout, and the various features are not necessarily drawn to scale. In the following discussion and in the claims, the terms "including", "includes", "having", "has", "with", or variants thereof are intended to be inclusive in a manner similar to the term "comprising", and thus should be interpreted to mean "including, but not limited to . . . " Disclosed examples provide multi-pass video coding techniques and systems that do not increase computational complexity significantly compared to single pass approaches, while providing enhanced video quality. Described video coding techniques are hardware architecture independent and generally independent of video compression standards to facilitate adaptation for use in future generation video compression standards.

Figure 2:
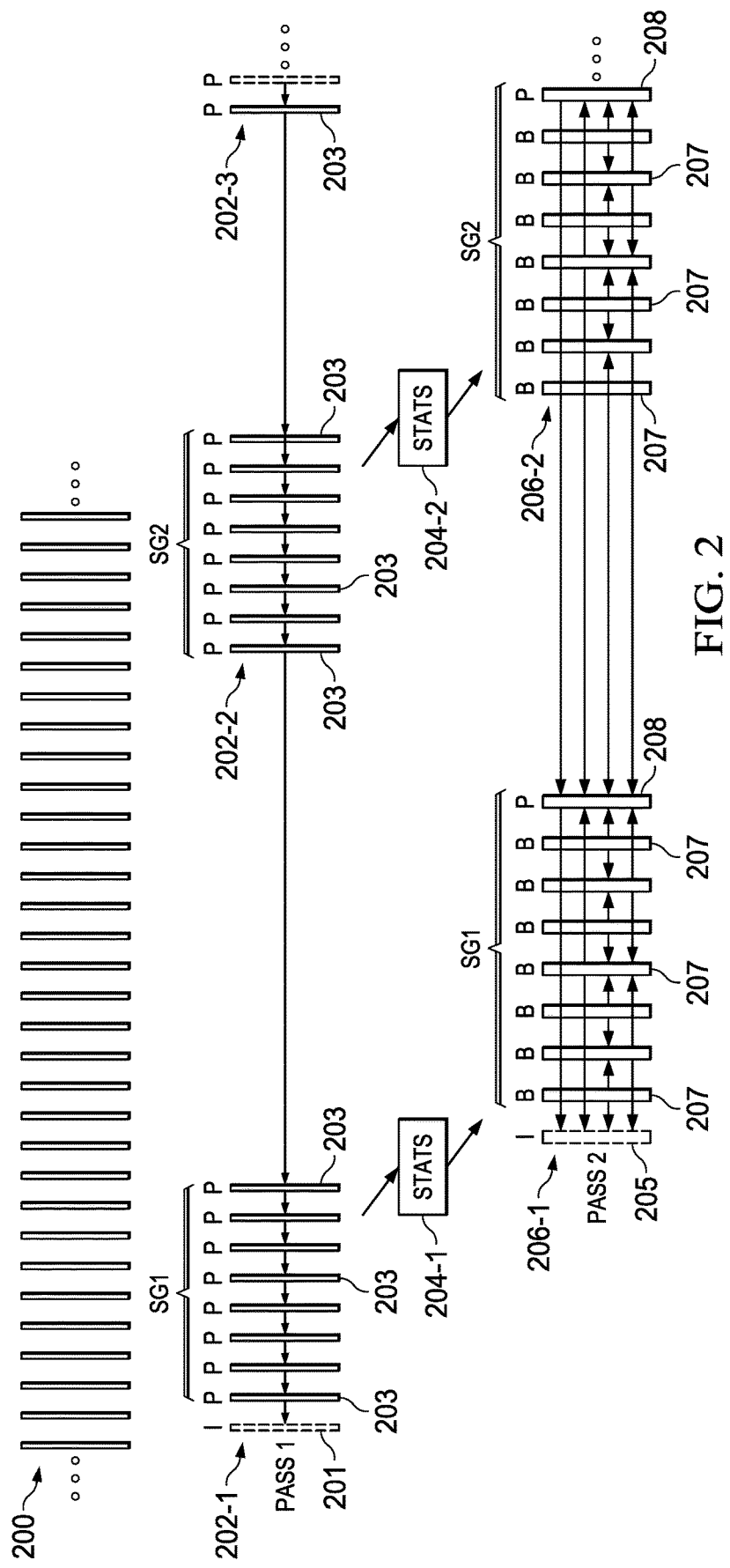
FIG. 2 is a diagram of an input video stream undergoing down sampled first pass encoding and full resolution second pass encoding.

Referring initially to FIGS. 1, 2 and 15, FIG. 1 shows a process or method 100 for encoding pictures or frames of an input video stream received at 102, and FIG. 2 shows a stream of input video frames 200 undergoing down sampled first pass encoding and second pass encoding according to the method 100. The method 100 can be implemented in any suitable video processing system, such as using an electronic memory 1506 and a processor or other encoding circuit 1504 shown in a video processing system 1502 of FIG. 15 to provide encoded video frames 1508 based on encoding of input video frames 200. The electronic memory 1506 in one example is a non-transitory computer readable medium that stores program code or other computer executable instructions for execution by the processor circuit 1504 to implement the method 100. The electronic memory 1506 also stores video frame data and other data used by the processor circuit 1504 to facilitate video encoding or compression. In other possible implementations, a dedicated encoder circuit 1504 can be used, which need not be a general purpose microprocessor, although the method 100 can be implemented in general purpose computers. In other implementations, the method 100 can be implemented in dedicated video processing systems such as the system 1502 in FIG. 15, for example, video systems for automotive applications (e.g., rear facing backup camera video processing, forward and/or side facing camera video processing for vehicle control applications, etc.), security monitoring systems, or other dedicated systems in which video data is encoded. Moreover, the host system 1502 in certain examples can also include video decoding circuitry or components (not shown).

The method 100 and FIG. 1 implements multi-pass video encoding, referred to herein as pseudo-multi-pass encoding in which an initial encoding pass (the first pass) is performed on down sampled video frames or pictures. At 104 in FIG. 1, input frames of the video stream 200 are sub-sampled or down sampled in first and second spatial directions, such as "X" and "Y" directions respectively represented by rows and columns of individual input video frames 200. Any suitable down sampling can be implemented at 104 in the process 100. The down sampling in one example is done by a fixed factor which is a small integer, for example, in the range of 2 to 4. The down sampling for the first pass reduces the first pass encoding complexity significantly compared to conventional multi-pass encoding techniques. For example, down sampling at 104 by a factor of 4 in each direction reduces the complexity of the first pass to less than 10% of the complexity of the second pass. A lower down sampling factor (e.g., 2) can be used, for example, for lower resolution input video frames 200, where complexity is not a limiting factor.

The process 100 operates using "SUB-GOP" based processing according to subsets or subgroups of pictures or frames (SUB-GOPs). As used herein, a group of pictures (GOP) is a set of multiple encoded video frames including a single "intra coded" frame (I frame), such as the I frame 201 shown in the first pass encoded frames of FIG. 2. The I frame is encoded independently of the other first pass coded frames 203. In the described examples, the first pass encoding uses "IPP" encoding techniques, and the resulting GOP includes the single I frame (frame 201) as well as a plurality of first pass "predictive coded" frames (P frames) 203 that individually include motion-compensated difference information relative to a single one of the other first pass coded frames 201 and 203. In one example, the P frames 203 include motion-compensated difference information relative to the immediately preceding first pass coded frame. The GOP structure indicates the ordering or arrangements of frames beginning with an I frame, followed sequentially by one or more P frames. The I frame indicates the beginning of the GOP. The I frame includes the full image and does not require additional information from neighboring frames for reconstruction during video decoding, although I frames may be intra-predictively coded (or spatially coded). Some or all of a P frame may be inter-predictively coded (or temporally coded) based on information from neighboring frames.

Disclosed examples also group coded frames into subsets or sub-groups referred to herein as "SUB-GOPs". For example, the encoding operations illustrated in FIG. 2 show received input frames 200 that are down sampled and encoded in a first pass (PASS 1) to provide a GOP structure with a single leading I frame 201 followed by first pass SUB-GOPs 202-1, 202-2, 202-3, etc., each including a set of P frames 203. The example of FIG. 2 shows two complete first pass SUB-GOPs 202-1 and 202-2, designated as SG1 and SG2, respectively, although a typical stream of first pass coded frames will include many such SUB-GOPs 202. Similarly, the example in FIG. 2 shows two corresponding second pass SUB-GOPs 206-1 and 206-2, individually including one or more "bipredictive coded" frame or B frame 207, and ending with a second pass P frame 208. In one example, each B frame references only two pictures, one of which precedes the B frame and the other succeeding or following the B frame in display order. The second pass encoding (PASS 2) provides a GOP structure with a leading second pass I frame 205, followed by the two illustrated SUB-GOPs 206-1 and 206-2, which correspond to the indicated first pass SUB-GOPs 202-1 and 202-2.

At 106 in FIG. 1, a first pass encoding process is performed to encode the down sampled frames. In one example, the first pass encoding at 104 uses IPP coding to generate a set of first pass coded I and P frames 201 and 203. The first pass encoded frames 201 and 203 form a first pass GOP including a single first pass I frame 201 encoded independently of the other first pass coded frames 203, and a plurality of first pass predictive coded frames P frames 203 that individually include motion-compensated difference information relative to a single one of the first pass coded frames 201 and 203. The first and second pass encoding operations can include creation of suitable number of I frames to form a corresponding number of GOPs, where more GOPs makes the encoded video easier to edit, although higher numbers of GOPs and I frames increases the bit rate needed to code the video stream.

The first pass can be considered a pseudo encoding pass to encode the spatially down-sampled video frames, and is performed in one example for every down sampled frame. The first pass is less complex than the second and any subsequent encoding pass(es) since the sub-sampled video frame data is smaller than the full resolution video data of the input frames 200. In one example, the encoder circuit (e.g., processor 1504 in FIG. 15) computes or identifies one or more metrics or quantities used to set an integer number "N" representing the SUB GOP size and/or to facilitate the second encoding pass processing, and stores these metrics and/or statistics in the electronic memory 1506.

In certain examples, a SUB-GOP size is optionally determined at 108 as part of the first encoding pass processing, as discussed further below in connection with FIGS. 12-14. For example, the processor circuit 1504 computes one or more metrics associated with the down sampled video frames at 108 in the first encoding pass, and determines the integer number N of second pass frames 207 and 208 for the second pass SUB-GOPs 206 according to the metric or computed metric(s).

At 110 in FIG. 1, first pass encoding statistics 204 are computed or otherwise generated for the individual first pass SUB-GOPs 202 of the first pass P frames 203, and stored for later use in the second pass for the corresponding second pass SUB-GOPs 206. In some example, the encoder circuit 1504 generates one or more picture or frame level statistics 204 at 110, including one or more of a position of a frame 200 of the first pass SUB-GOP that forms a first picture of a new scene, a count of intra coded macro-blocks MB in the individual first pass coded frames 201, 203, one or more variance values computed separately in the X and Y directions of all motion vectors (MV) associated with the individual first pass coded frames 201 and 203, a mean value of all motion vectors MV of the individual first pass coded frames 201 and 203, and/or a mode value of all motion vectors MV of the individual first pass coded frames 201 and 203. In some examples, the first pass encoding statistics 204 include motion vector MV information associated with individual macro-blocks MB in the individual first pass coded frames 201 and 203.

At 112, the circuit 1504 performs a second encoding pass to encode the full resolution input video frames 200 to generate a set of second pass coded frames 205, 207 and 208 forming one or more GOPs. The second pass coded frames include a single second pass I frame 205 for each GOP. The second pass I frame 205 is encoded independently of the remaining second pass coded B and P frames 207 and 208. The individual second pass SUB-GOPs 206 include an integer number N of the remaining second pass coded frames 207 and 208, two of which 206-1 and 206-2 are shown in FIG. 2 for a SUB-GOP size N=8. The individual second pass SUB-GOPs 206 individually including at least one second pass B frame 207 that includes motion-compensated difference information relative to two other second pass coded frames 205, 207 and 208, and at least one second pass P frame 208 that includes motion-compensated difference information relative to a single other second pass coded frame 205, 207, 208. The second encoding pass at 112 includes encoding the frames of the individual second pass SUB-GOPs 206 according to the first pass encoding statistics 204 generated for the corresponding first pass SUB-GOP 202. As shown in FIG. 2, for example, the second pass SUB-GOP 206-1 is encoded according to the statistics 204 from the first pass SUB-GOP 202-1, the second pass SUB-GOP 206-2 is encoded according to the statistics 204 from the first pass SUB-GOP 202-2, and so on.

In one example, the second encoding pass for a given SUB-GOP 206 is started before the first encoding pass for a subsequent SUB SUB-GOP 202, and the first and second pass encoding can be performed at 106 and 112 using a single encoder circuit 1504. In this manner, disclosed examples provide efficient multi-pass encoding that is agnostic to a given hardware architecture. Moreover, the second pass encoding at 112 uses the original resolution of the input video frames 200, and the information generated during the first pass enhances the video quality during the second pass. In one example, the final bit stream of video data (1508 in FIG. 15) is generated during the seconding encoding pass. In other examples, the pseudo multi-pass process 100 can include more than two encoding passes.

In the example of FIG. 1, the pseudo-multi-pass encoding is done on a SUB-GOP basis, and the encoder circuit 1504 performs any further encoding passes in the initial SUB-GOP at 114. At 116, a first pass encoding is performed with down sampled frames of the second (next) SUB-GOP using the first pass processing described above at 106. The encoder circuit 1504 generates statistics for the current first pass SUB-GOP 202 at 118, and uses these to perform a second pass encoding at 120 to generate a corresponding second pass SUB-GOP 206, and optional further passes are performed at 122 for the current SUB-GOP. The encoder circuit 1504 determines at 124 whether the final SUB-GOP has been processed. If not (NO at 124), the next SUB-GOP is obtained at 126, and the processing at 116, 118, 120 and 122 is repeated. Once the last SUB-GOP has been encoded via the pseudo-multi-pass processing (YES at 124), the encoding process is completed at 128.

In practice, larger SUB-GOP structures such as hierarchical coding (e.g., size N=4 or 8 or more) generally increase coding efficiency. However in some instances, due to differences in coding and display order, and also due to larger temporal distance between a given frame under compression and associated reference frames, larger SUB-GOP structures may be inferior to short SUB-GOP structures. In the illustrated examples, the first pass encoding at 106 (and also at 116) is done using IPP encoding. A single encoder can be used with the statistics 204 being provided from the first pass to the second pass at the SUB-GOP boundaries, resulting in minimal communication needs between two passes. In these examples, the second pass encoding at 112 (and at 120) is offset in time from the first pass processing of the given SUB-GOP by a fixed number (N) of frames, which is determined by the SUB-GOP size used in the first pass. In this manner, when the second pass encoding begins, the encoding circuit 1504 has full knowledge of whole SUB-GOP which results in overall better video quality. Moreover, the second pass encoding at 112 and 120 advantageously employs the statistics 204 gathered during the first low resolution (down-sampled) encoding process for that SUB-GOP.

Figure 3:
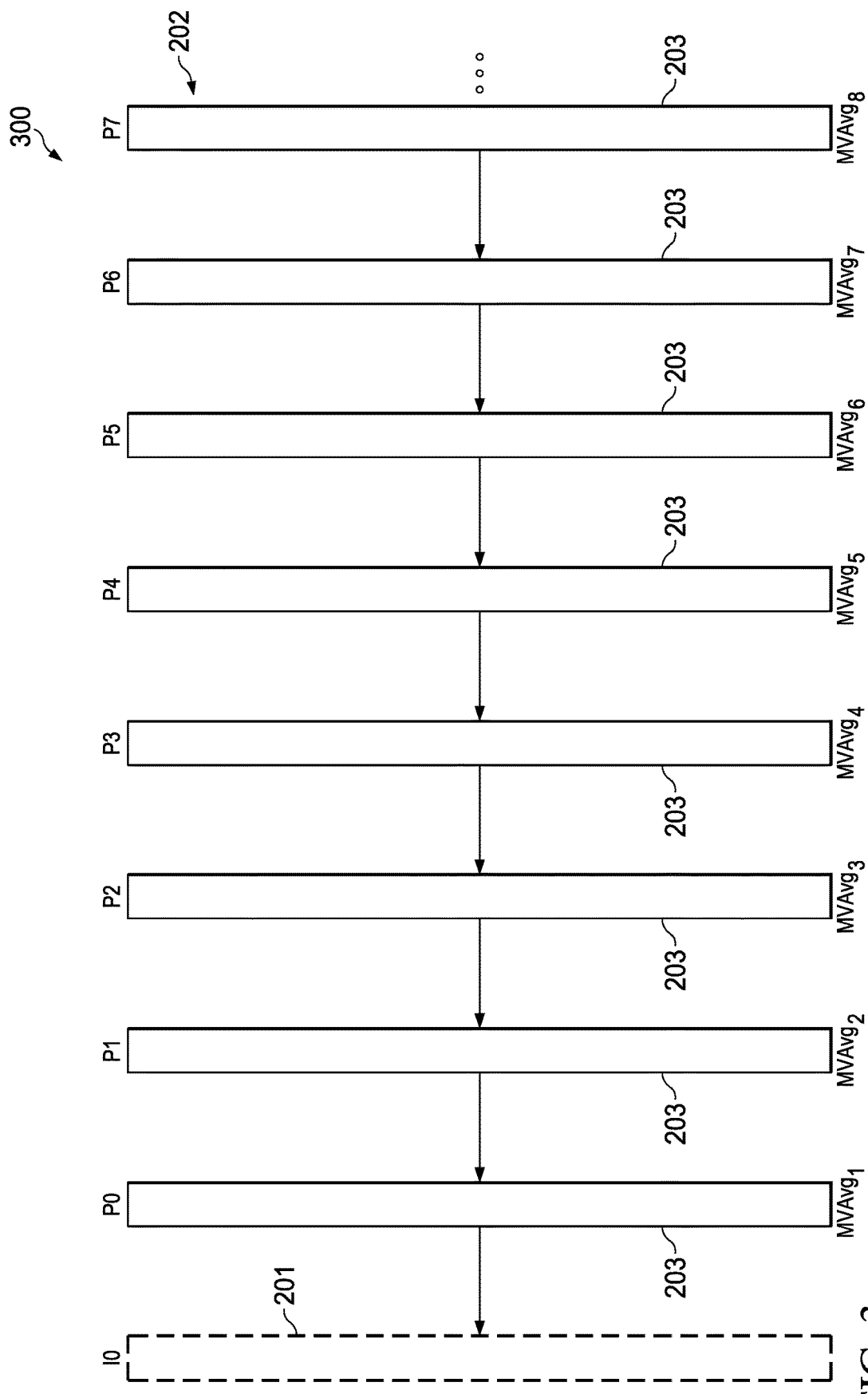
FIG. 3 is a diagram of average motion vector values computed for a first pass SUB-GOP.
Figure 4:
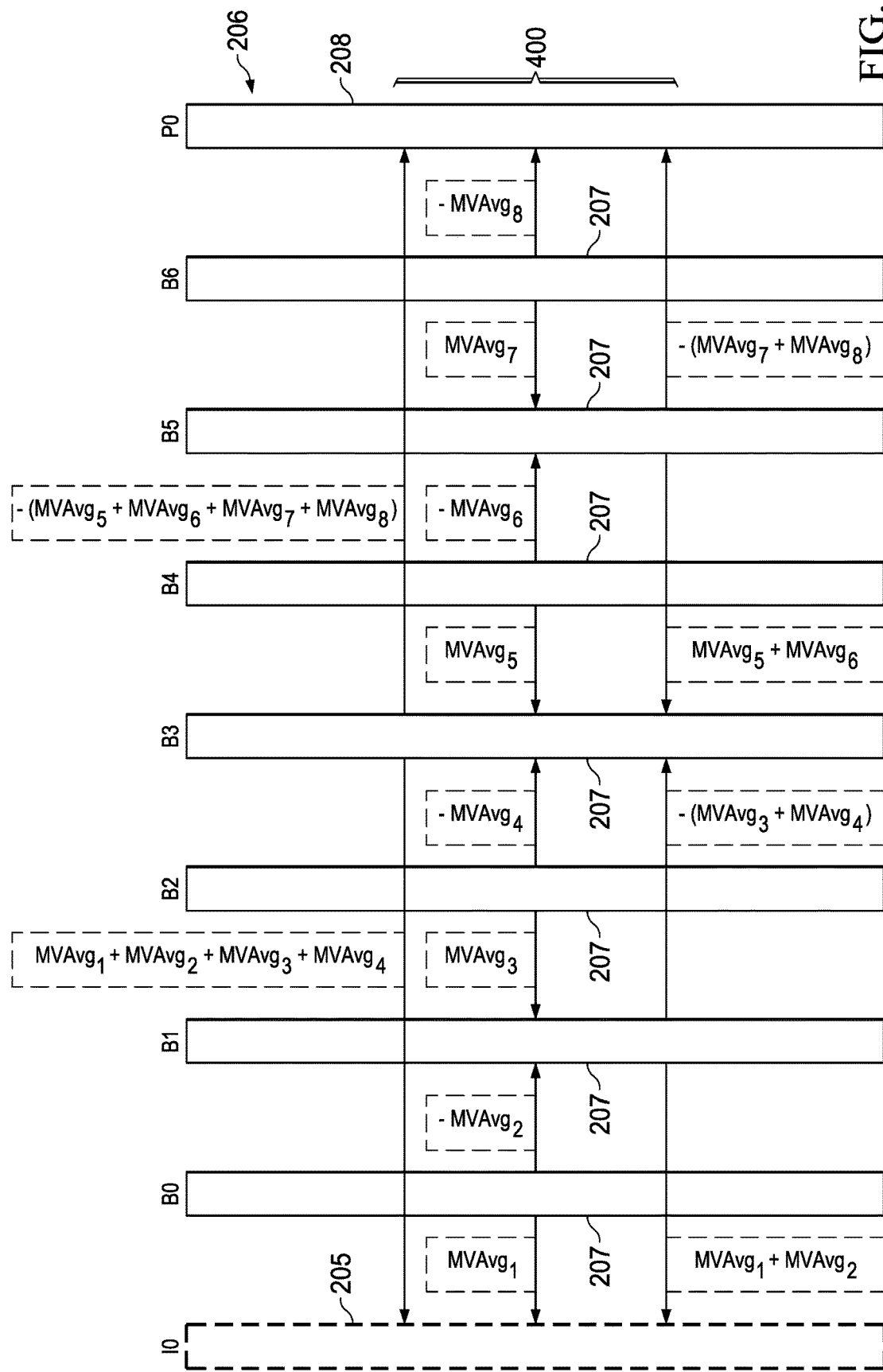
FIG. 4 is a diagram of motion vector computations for a second pass SUB-GOP based on corresponding first pass average motion vector values.

Referring also to FIGS. 3 and 4, the pseudo multi-pass encoding process 100 includes global motion offset computation based on actual motion information obtained in the first pass. FIG. 3 illustrates a portion 300 of a first pass encoded frame stream including an I frame 201 (10) and eight P frames 203 (P0 through P7). In one example, the encoder circuit 1504 in the first pass computes average motion vector values $MVAvg_1$ through $MVAvg_8$ as part of the SUB-GOP statistics 204 for the corresponding P frames P0 through P7 of the first pass SUB-GOP 202 as shown in FIG. 3. FIG. 4 shows motion vector computations for the corresponding second pass SUB-GOP 206 based on the corresponding first pass average motion vector values $MVAvg_1$ through $MVAvg_8$. In the second pass, the encoder circuit 1504 scales the first pass average motion vectors MVAvg according to the amount of down sampling performed on the video frames 200 of the first video stream during the first pass, in order to generate scaled first pass motion vectors, and uses the scaled vector values in the second pass encoding at 112.

As shown in one example in FIG. 4, the encoder circuit 1504 computes a second pass mean global motion vector (GMV) 400 for offsetting the search window during motion estimation for the individual second pass B frames 207 of the individual second pass SUB-GOPs 206 according to the scaled first pass vector values MVAvg. In one example, the second pass B frame mean motion vectors GMV 400 are individually computed as a cumulative sum of the scaled first pass mean motion vectors for the first pass coded frames 201, 203 to which the individual B frame 207 is referenced and any intervening first pass coded frames 201, 203. In this example, moreover, the cumulative sum adds scaled first pass mean motion vectors MVAvg for first pass coded frames 201, 203 temporally preceding the B frame 207, and subtracts the scaled first pass mean motion vectors MVAvg for first pass coded frames 201, 203 temporally succeeding the B frame 207 to account for direction in the frame sequence.

In FIG. 4, the arrows denote the way reference frames are chosen, where the head of each arrow denotes the reference frame and the arrow tail denotes the frame which is going under motion estimation. The formulas in the boxes 400 denote the equations used to derive the mean GMV for each of bidirectional predictive B frames 207. For example, the GMV for a first level (level 1) B frame B4 in FIG. 4 is $MVAvg_5$ (Forward direction), $-MVAvg_6$ (Backward direction), and the GMV for a second level B frame B1 in FIG. 4 is $MVAvg_1 + MVAvg_2$ (Forward direction), $-MVAvg_3 - MVAvg_4$ (Backward direction). For the individual second pass P frames 208 (e.g., P0 in FIG. 4, the encoder circuit 1504 computes the corresponding second pass mean motion vectors GMV 400 as a cumulative sum of the scaled first pass mean motion vectors for the first pass coded frames 201, 203 of the corresponding second pass SUB-GOP 206. In the illustrated example for SUB-GOP size N=8, the encoder circuit 1504 computes the GMV for P0 as $GMV = MVAvg_1 + MVAvg_2 + MVAvg_3 + \ldots + MVAvg_7 + MVAvg_8$. This is unlike single pass approaches, in which a global motion offset is computed based on motion observed in one or more previously encoded frames. Described pseudo multi-pass examples results in better estimate of global motion offset, especially when there is a change in global motion, since the GMV computation is based on actual motion information obtained in the first pass. The values are computed at the start of the frame encoding and used for all macro-blocks of that particular frame for motion estimation.

Figure 5:
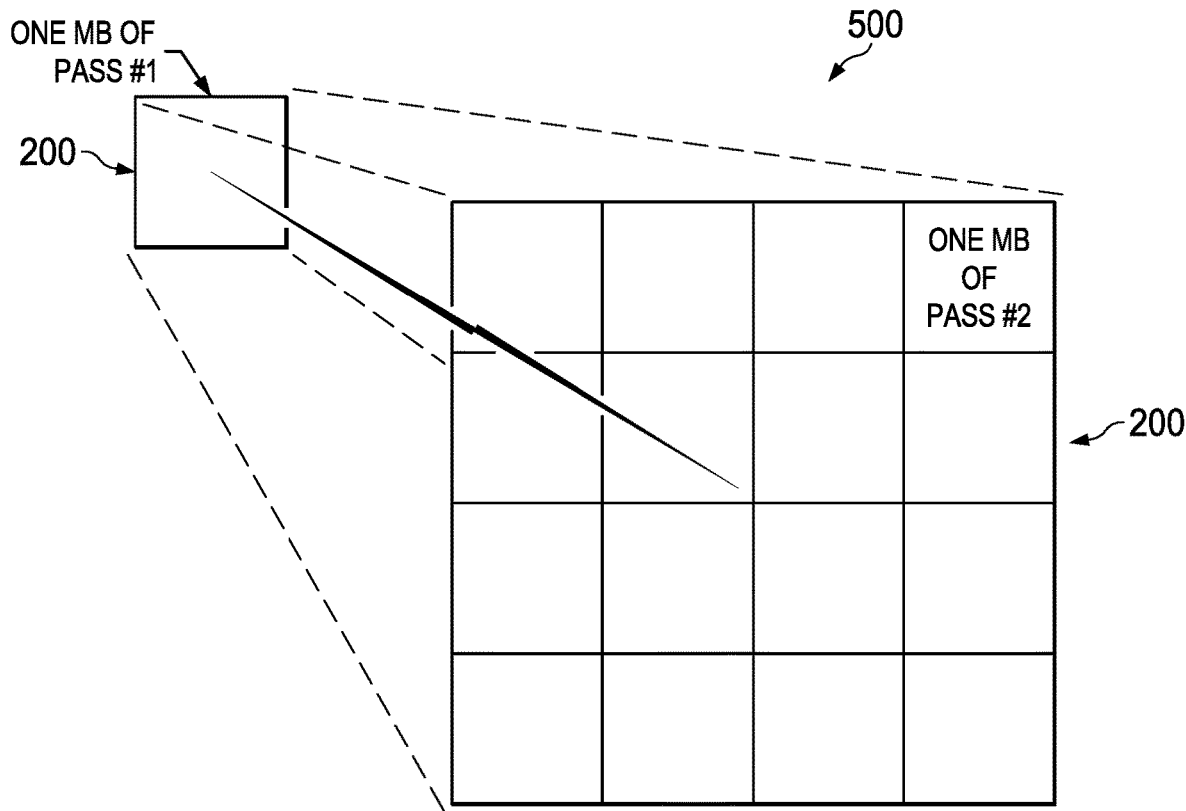
FIG. 5 is a diagram of macro block scaling for a frame in the first and second encoding passes.

FIG. 5 shows a diagram 500 depicting a macro block for a frame in the first pass and a corresponding group of 16 second pass macro-blocks. The encoder circuit 1504 in certain examples uses macro block (MB) level motion information obtained from the first pass for improved motion estimation (ME) in the second pass. This approach facilitates better object tracking in case of video with irregular motion and around object boundaries. In this regard, motion estimation can potentially fail for many macro-blocks if a frame is undergoing motion which is incoherent with respect to its neighbor frames and/or if it is the first macro block of a new object under search. In these situations, any temporal or spatial predictor obtained in a causal manner will not be able to predict correct motion. In the example of FIG. 5 using a down-sampling factor of 4 in the first pass, a single first pass macro block is derived from pixels corresponding to 16 macro-blocks of the full resolution frame 200 encoded in the second pass. In certain examples, the encoder circuit 1504 uses the first pass macro block motion vector to improve the efficiency of the second pass motion estimation. The first pass motion vector obtained for a first pass macro block is scaled up appropriately (e.g., by a factor of 4 in this case) to account for the down sampling done for the first pass encoding, and the scaled up motion vector is used as an extra seed predictor for motion estimation in the second pass. In this manner, the second pass processing uses an actual motion vector searched at the same X, Y location, although at the lower down-sampled resolution. The low resolution motion vector, moreover, is not restricted by causal constraints found in single pass approaches, and the second pass encoding performs better for frames having complex irregular motion. This approach also reduces the number of intra coded macro-blocks in the frame due to better motion estimation accuracy, and thus improves overall video quality.

Figure 6A:
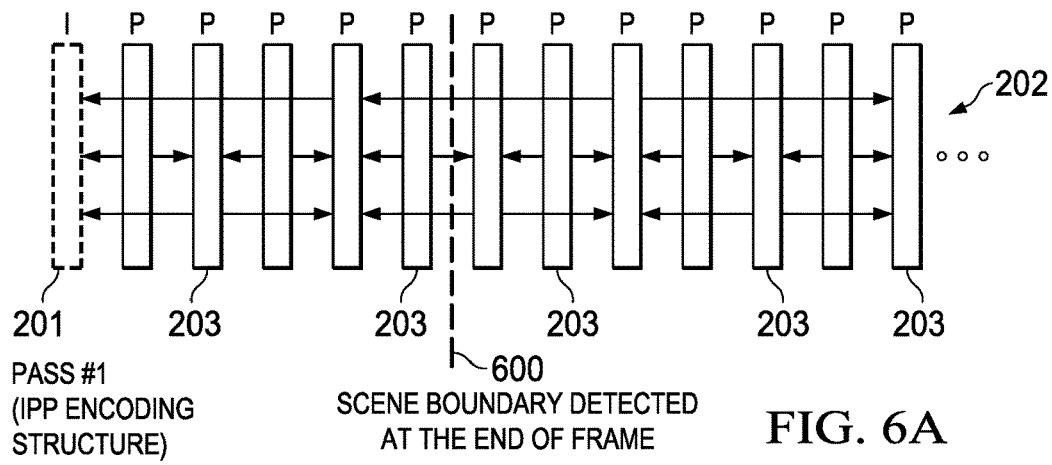
FIG. 6A is a diagram of first pass IPP encoded frames with a detected scene boundary.
Figure 6B:
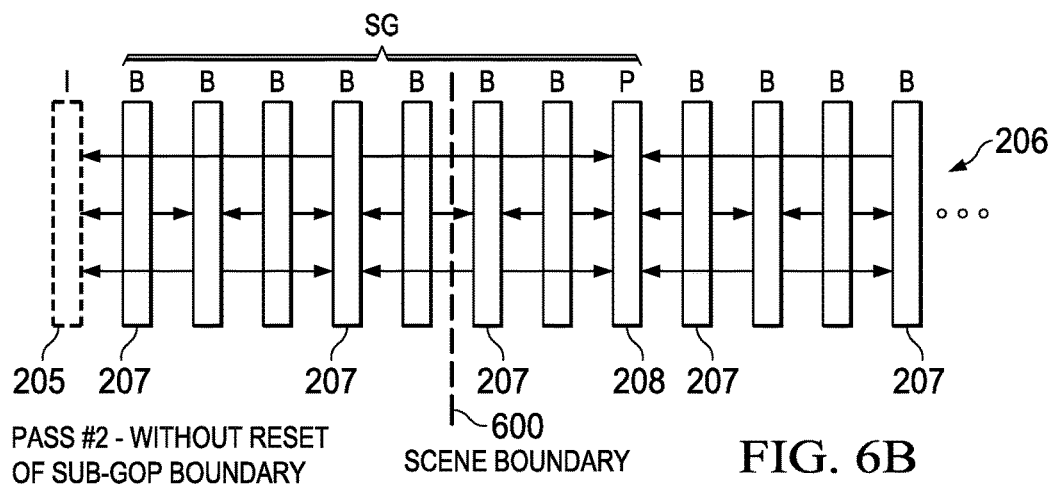
FIG. 6B is a diagram of corresponding second pass IBP encoded frames without SUB-GOP boundary resetting.
Figure 6C:
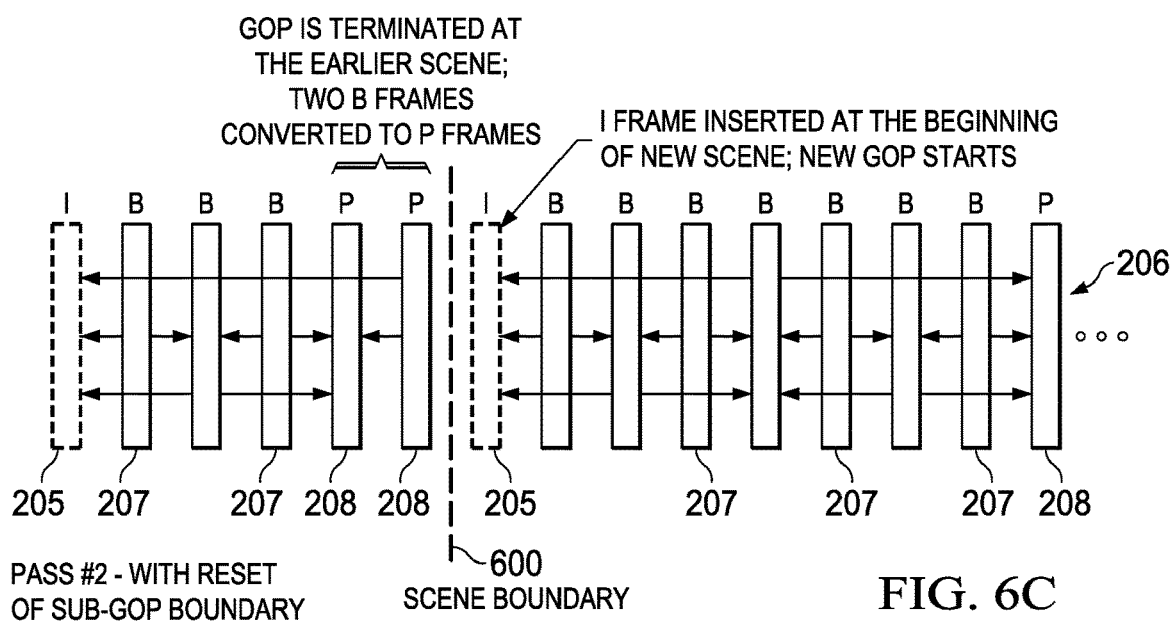
FIG. 6C is a diagram of second pass IBP encoded frames with a SUB-GOP boundary adjusted according to a detected scene boundary.

Referring now to FIGS. 6A-6C, the encoder circuit 1504 in certain examples selectively resets of SUB-GOP boundaries so that the first frame of a new scene detected in the first pass is coded as an I or P frame, and a new SUB-GOP begins from that frame. This improves video quality immediately after a new scene in a significant way. FIG. 6A shows first pass IPP encoded I frame 201 and P frames 203 with a scene boundary 600 detected during first pass processing. FIG. 6B shows corresponding second pass IBP encoded frames 205, 207 and 208 without SUB-GOP boundary resetting, and FIG. 6C shows an example implementation of the corresponding second pass IBP encoded frames 205, 207 and 208 where the encoder circuit 1504 adjusts the SUB-GOP boundary according to the previously detected scene boundary 600. In one example, the first pass encoding of the down sampled frames (106 in FIG. 1) includes determining if a new scene begins within a given first pass SUB-GOP 202, for example, as shown in FIG. 6A. The second pass encoding at 112 of the high resolution input video frames 200 in this example includes adjusting a boundary of a corresponding second pass SUB-GOP 206 as seen in FIG. 6C if a new scene is determined to begin in the corresponding first pass SUB-GOP 202.

This feature addresses received input video content including abrupt scene cuts, and which scene boundaries can fall anywhere within a given SUB-GOP. With respect to encoded B frames, the position of scene changes in relation to the SUB-GOP boundaries can adversely affect the coding efficiency of frames that belong to a given SUB-GOP, since one or more B frames will only have good matching references in one direction, leading to poor coding efficiency of those frames in single pass encoder. As shown in FIG. 6B, when the SUB-GOP boundary is not reset at the scene change, there are many B frames 207 which have a reference matching only in one direction as any reference coming temporally before the scene cut will not yield any good matches. To address this problem, the encoder circuit 1504 in certain examples determines whether a new scene (e.g., scene boundary 600 in FIG. 6A) during the first encoding pass. In one example, this may be accomplished by looking at encoding statistics such as number of intra macro-blocks during the first pass to provide a look-ahead feature in the second pass. Based on the knowledge of the position of the frame where a new scene begins, the pseudo multi-pass approach adjusts the SUB-GOP boundary during the second pass appropriately. In the example of FIGS. 6A and 6C, the encoder circuit 1504 converts two of the originally designated B frames 207 to P frames 208 at the end of the adjusted SUB-GOP 206 preceding the detected scene boundary 600 as shown in FIG. 6C, which facilitates improved video compression as the B frames 207 get useful references as both belong to the same scene that precedes the scene boundary 600.

Figure 7:
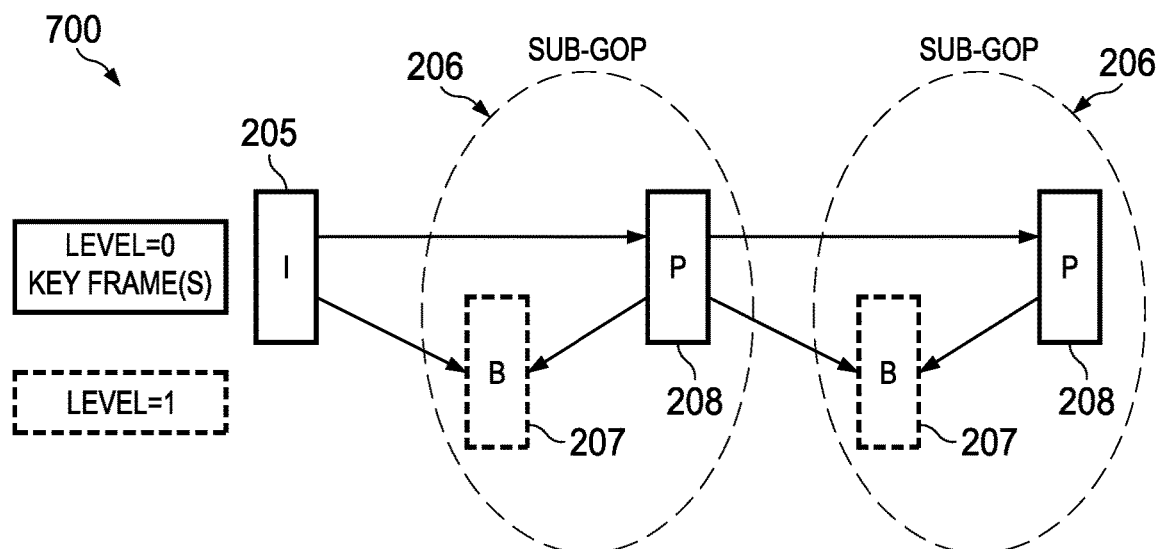
FIG. 7 is a diagram of an example second pass two-level SUB-GOP IBP encoding.
Figure 8:
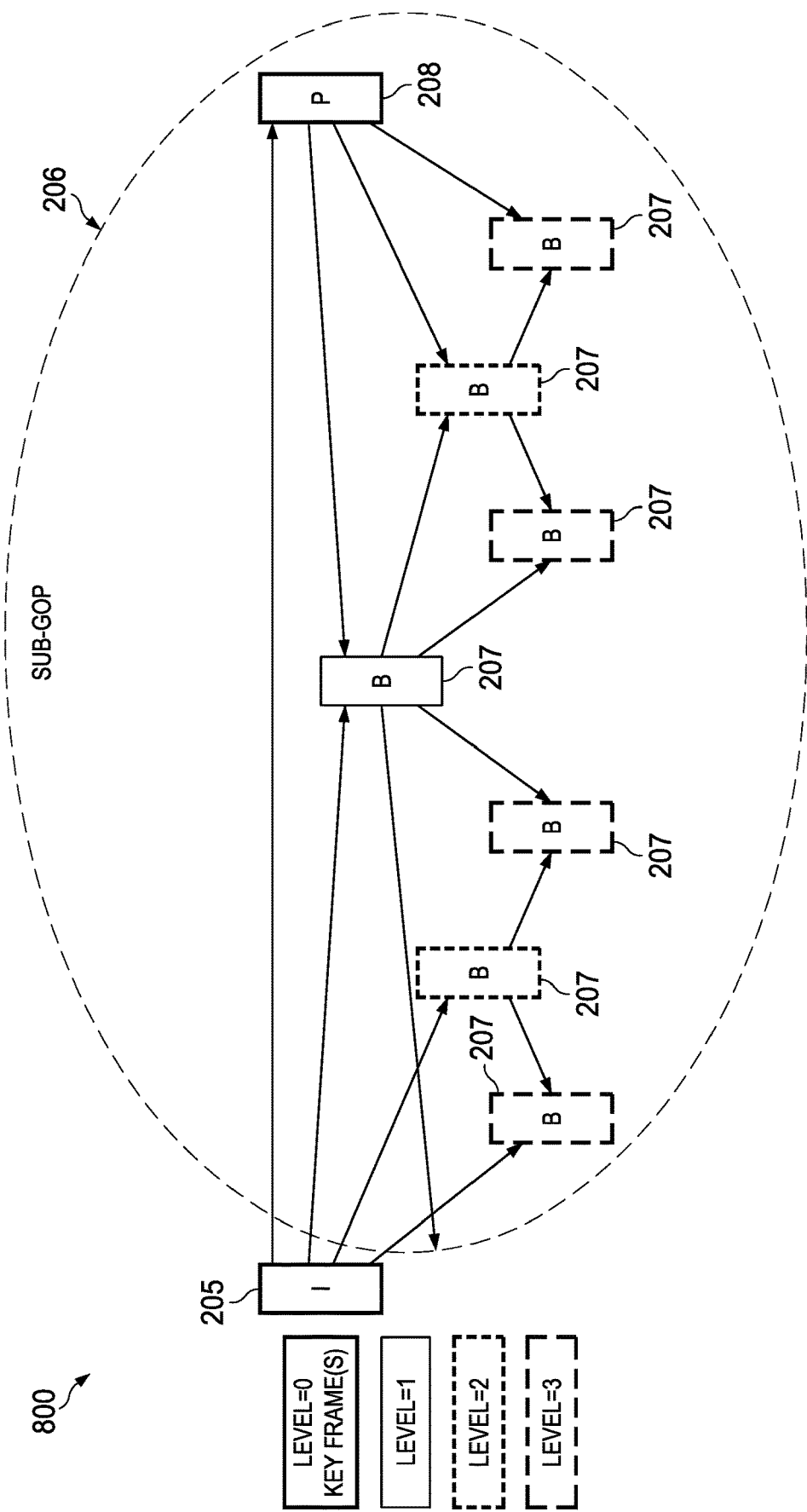
FIG. 8 is a diagram of a four-level second pass SUB-GOP IBP encoding.

Referring now to FIGS. 7 and 8, the pseudo multi-pass encoding process 100 can be employed with any suitable level of second pass encoding for the second pass SUB-GOPs 206. FIG. 7 provides a diagram 700 showing an example second pass two-level SUB-GOP IBP encoding, and a diagram 800 and FIG. 8 shows a four-level second pass SUB-GOP IBP encoding example. The encoder circuit 1504 in certain examples defines the SUB-GOP structure according to encoding levels. The encoding levels are defined based on their referencing schemes for the second pass encoding. Encoding level 0 includes frames that may be used by other level 0 frames for their references. These frames do not use references from higher level (e.g., level 1 or above), and hence are encoded in the second pass as I frames 205 or as P frames 208. For the individual higher levels (level n), the frames have references from level n−1 and below (n>=0), and the encoded frames are used for reference by level n+1 and above (n>0). As seen in the 2 and 4 level examples of FIGS. 7 and 8, the frames above level 0 are encoded in one example as B frames 207. The SUB-GOP structure 206 in one example defines a set of frames starting with a level 0 frame and ending before next level 0 frame appears for encoding. This ensures only one level 0 frame in each SUB-GOP at the beginning. Certain examples employ two types of SUB-GOP structures based on the type of the first frame, I type or P type. The first SUB-GOP structure is called an I type SUB-GOP if the first frame is an I frame, and for all other cases the second SUB-GOP structure is called a P type SUB-GOP 206.

The above described pseudo multi-pass systems and techniques provide significant advantages over and other types of conventional multi-pass encoding. In particular, x.264 (software library for encoding video streams into the H.264 format) results in many fold increase in computation time compared to single pass encoding, whereas the disclosed examples provide a pseudo multi-pass solution suitable for a real-time encoding and increases computation complexity of going from single pass to dual pass approach by less than 10% of overall complexity for the above described 4-factor down-sampling implementation. In addition, the data for statistics 204 exchanged between the two passes is done on a SUB-GOP basis and is very small since most of the quantities are only computed and stored at picture or frame level, and macro block level quantities are few. In addition, a single encoder circuit 1504 can be used for both the first and second encoding passes, and the technique is independent of the particular hardware architecture used. In addition, the use in certain examples of IPP first pass encoding and first pass SUB-GOP structures facilitates efficient handling of many complex situations like scene change boundaries falling anywhere in the SUB-GOP, non-stationary motion within SUB-GOP, etc., and certain examples provide selective SUB-GOP adjustment for detected scene boundaries in the received video frames 200. In addition, while conventional multi-pass encoding suffers from high encoding latency, and are thus unsuitable for live or real-time encoding, the described examples employ the first or pseudo pass, which runs at much lower resolution, thereby facilitating much faster encoding time hence and much less latency compared with conventional multi-pass encoding techniques. In this manner, the disclosed examples are particularly suitable for live encoding, while providing significant encoding quality improvements over single-pass approaches.

The video quality improvements over single-pass techniques can be expressed in terms of PSNR, as shown in Table 1 below. In this example, the pseudo multi-pass method 100 provides a maximum gain of 0.85 dB in BDPSNR and a max bit-rate saving of 18% as compared with single pass. In addition, the pseudo multi-pass approach in Table 1 shows an average gain of 0.21 dB in BDPSNR and an average bit-rate saving of 5% over single pass encoding.

TABLE 1

| VQAM Set | BDPSNR (dB) | Bit rate savings(%) |
| --- | --- | --- |
| Max | 0.85 | 18.06 |
| Average | 0.21 | 5.12 |

In many applications, consistent video quality is important. While single pass approaches typically provide uniform quality, this is not true in all situations, for an example the scenario of sudden change or varying nature of input complexity. In contrast, the described pseudo multi-pass approach provides more consistent video quality in the presence of sudden changes and/or varying input complexity, due to usage of statistics 204 from first pass and look-ahead operation is able to generate more consistent video quality.

Figure 11:
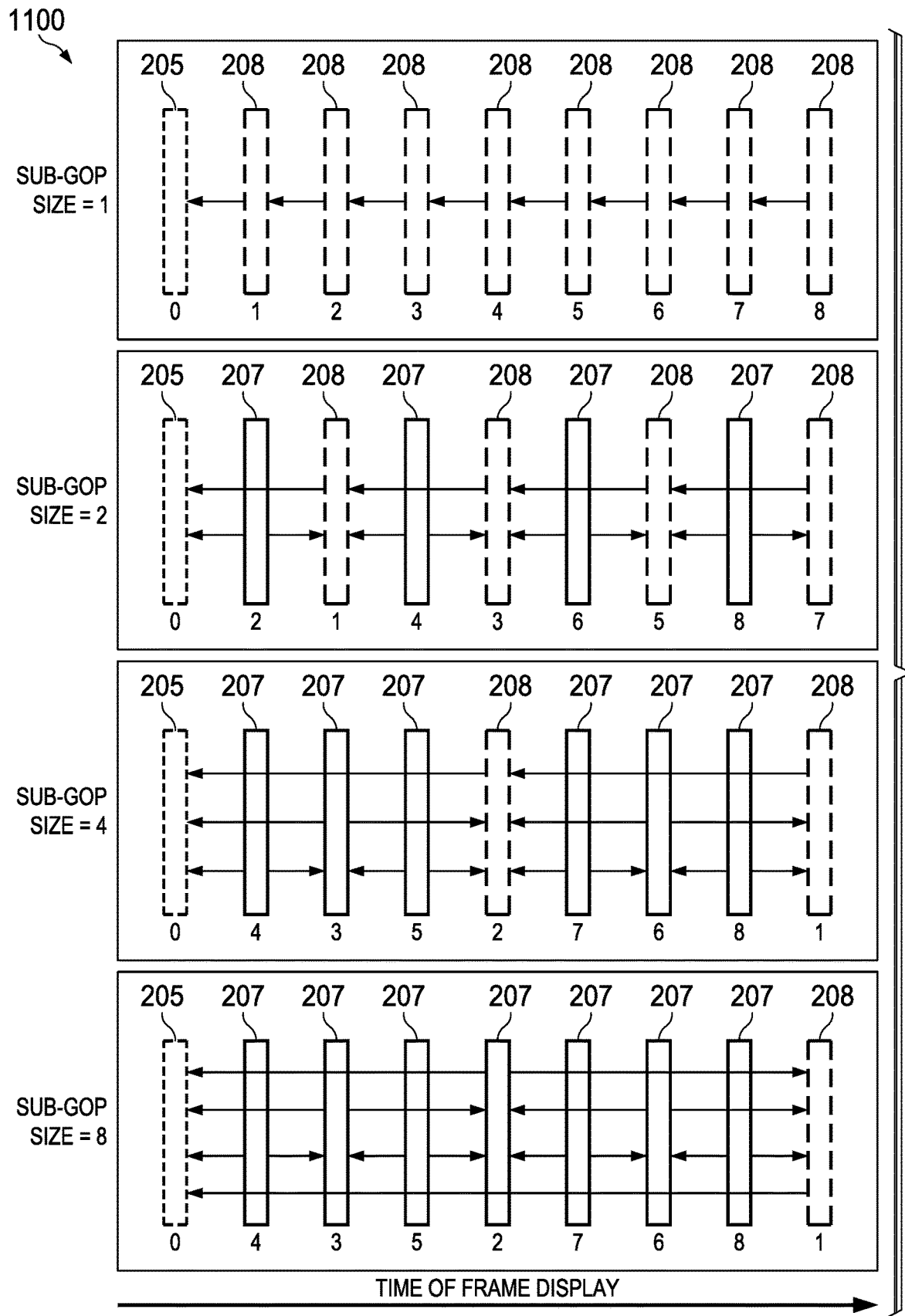
FIG. 11 is a diagram of IBP-coded SUB-GOPs of sizes 1, 2, 4 and 8.

Referring now to FIGS. 9-12, a diagram 900 illustrating second pass IBP-coded SUB-GOPs with a SUB-GOP size N=2, and a diagram 1000 in FIG. 10 shows a second pass IBP-coded SUB-GOP with a SUB-GOP size N=8. FIG. 11 provides a diagram 1100 showing IBP-coded SUB-GOPs of sizes 1, 2, 4 and 8. Video coding standards like H.264/AVC, support different types of frame coding. Intra (I), predictive (P) and bi-predictive (B) frame types are commonly used in broadcast and consumer classes of video compression. Certain frames in the coded video are called key frames, where all previously coded frames precede a key frame, in display order. At the time when a key frame is coded, no other later frame (in display order) has yet been encoded. One such example is shown in FIG. 9, in which the arrows denote the way the reference frames are chosen. The head of the arrow denotes the reference frame and tail of the arrow denotes the frame which is going under motion estimation. The same convention is shown in FIGS. 10 and 11. In this example, the I and P frames 205 and 208 are key frames, and the frames between the key frames are coded as B frames 207. A SUB-GOP refers to the set of frames that are encoded between two consecutive key frames that appear in display order. The later of the two key frames is included in the current SUB-GOP but not the earlier of the two key frames. FIGS. 9 and 10 show two such examples SUB-GOPs.

Since one or more frames use these key frames as reference, coding a key frame with poor quality can affect quality of frames of all SUB-GOPs which use that key frame as a reference either directly or indirectly. The coding of the B frames 207 increases compression efficiency in low and moderate motion sequences, but the frames 207 may not be suitable for coding high motion video when the presence of B frames increases the distance between the key frames. In this regard, as the distance to reference frame increases, the coding efficiency of P type key frames go down due to poorer prediction match. Compression efficiency of a video segment is thus sensitive to the value of the SUB-GOP size N, as this determines the distance between two consecutive key frames. In applications involving broadcast video, the characteristics of video content may vary significantly with time (e.g., news video clips can have talking-head video and sports video back to back). Hence with a fixed SUB-GOP size, the video encoder will not be able to generate the best compression efficiency for the entire video.

In order to address this, the encoder circuit 1504 in certain examples computes one or more metrics in the first pass encoding and determines the number N of second pass frames 207, 208 for the second pass SUB-GOPs 206 according to the computed first pass metric or metrics. In certain examples, the encoder circuit 1504 can adjust the SUB-GOP size N from compression efficiency point of view in each of a plurality of time segments. In certain examples, moreover, the encoder circuit 1504 uses hierarchical coding structures of SUB-GOP with dyadic SUB-GOP sizes of 1, 2, 4 and 8 using B frames 207 as shown in FIG. 11.

In certain examples, a maximum SUB-GOP size can be specified by the user at the start of encoding, and the encoder circuit 1504 adapts to the video content and selectively adjusts the SUB-GOP size for individual time segments.

Figure 12:
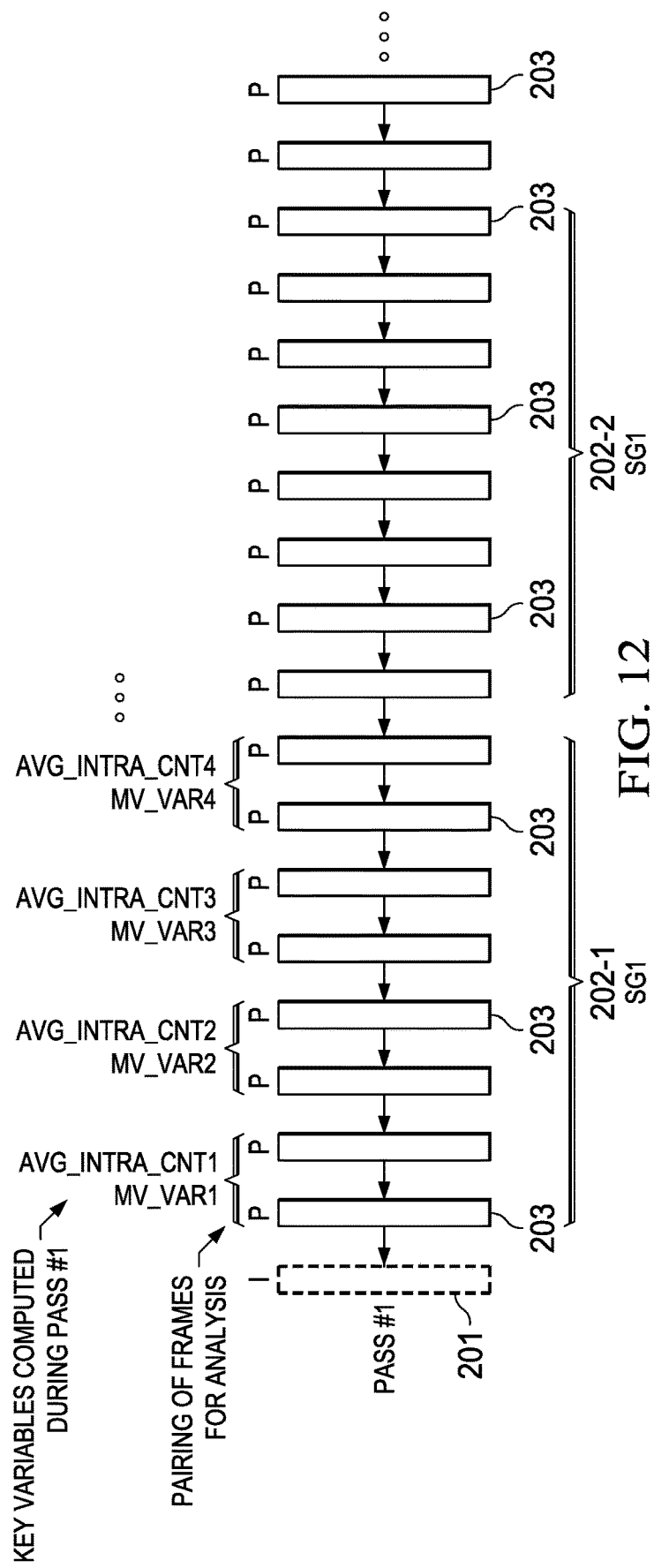
FIG. 12 is a diagram of first pass frame pair analysis to compute average motion vector variance to determine SUB-GOP size.

FIG. 12 illustrates first pass frame pair analysis to compute average motion vector variance to determine SUB-GOP size. In one example, as described above, the encoder circuit 1504 utilizes a pseudo multi-pass encoding approach to first encode the down-sampled frames in the first pass using IPP coding as shown in FIG. 12. The encoder circuit 1504 then uses the first pass statistics 204 to encode the full resolution video in the second pass. Except for the very first frame 201 at the beginning of sequence encoding, no other frame is coded as an I frame in first pass. The encoder circuit 1504 in certain examples analyses the video by looking at information of the first pass and decides the SUB-GOP size N for the second pass (at 108 in FIG. 1 above). The encoder circuit 1504 in one example uses the information on intra macro block count, motion vector of each macro block and global motion offset for the individual frames computed from the individual macro block motion vectors. At a frame level, the encoder circuit 1504 computes one or more metrics according to this first pass information and sets or adjusts the SUB-GOP size/structure.

Figure 13A:
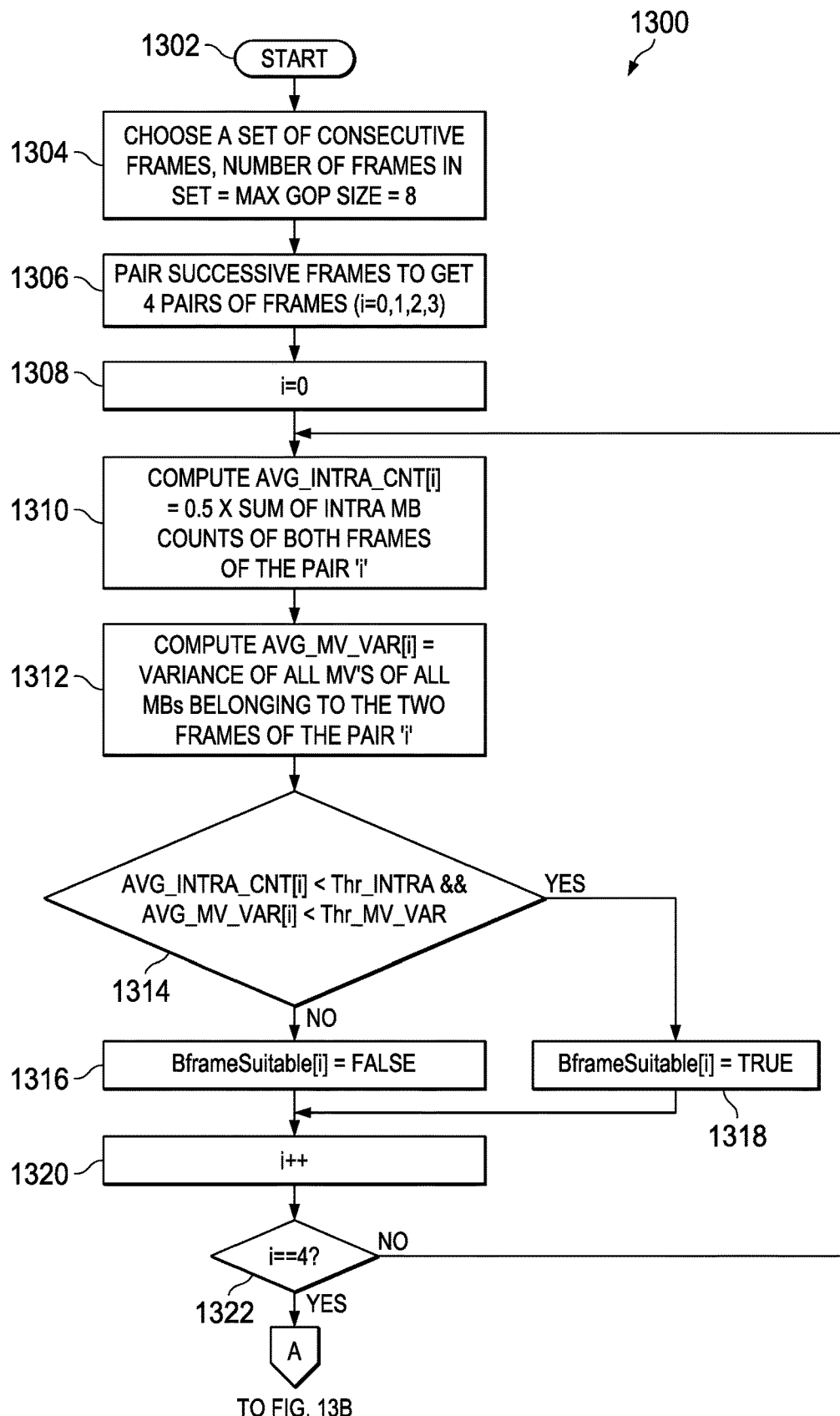
FIGS. 13A and 13B are a flow diagram of SUB-GOP size determination.

Referring now to FIGS. 12-14, FIGS. 13A and 13B show a flow diagram 1300 of SUB-GOP size determination, which can be implemented using the encoder circuit 1504 in the video processing system 1502 of FIG. 15 in one example. In the following discussion, a maximum SUB-GOP size is assumed to be 8, but other larger or smaller SUB-GOP sizes can be used, such as 4 or 16. The process 1300 begins at 1302 in FIG. 13A, and the encoder circuit 1504 chooses a set of consecutive frames (e.g., as shown in FIG. 12) with the maximum SUB-GOP size N set in this example to 8 at 1304. In a first step, the encoder circuit 1504 computes key statistics such as average Intra MBs count and motion vector variance in the first pass. In a second step, the encoder circuit 1504 pairs up the first pass P frames 203 as shown in FIG. 12 (1306 in FIG. 13A). At 1308-1322 in FIG. 13A, for each frame pair, the encoder circuit 1504 marks a flag BFrameSuitableFlag as true or false. Three such examples are shown for the first pass in the diagram 1400 of FIG. 14, including a first example "Example-1" where the flags are marked True, True, True, True, a second example "Example-2" where the flags are marked False, False, False, False, and a third example "Example-3" where the flags are marked True, True, False, and True. As shown in FIG. 13A, the encoder circuit 1504 sets pair counter or index "i" equal to 0 at 1308, and computes a value AVG_INTRA_CNT[i] as 0.5 times the sum of the Intra MB counts of both frames of the pair at 1310. At 1312, the encoder circuit 1504 computes an average motion vector variance value AVG_MV_VAR[i] for the indexed frame pair as the variance of all motion vectors of all macro-blocks associated with the two frames of the pair.

At 1314, the encoder circuit 1504 determines whether the computed intra-count value AVG_INTRA_CNT[i] is less than a first threshold Thr_INTRA and the computed average motion vector variance value AVG_MV_VAR[i] is greater than a second threshold Thr_MV_VAR. If so (YES at 1314), the pair of frames under consideration are suitable to be encoded as B frames 207, and the corresponding BFrameSuitableFlag for the pair is set to True at 1318. Otherwise (NO at 1314), the pair is not suited for B frame encoding, and the flag BFrameSuitableFlag for the pair is set to False at 1316. The index "i" is then incremented by 1 at 1320, and the encoder circuit 1504 determines at 1322 whether the index has reached 4. If not (NO at 1322), the process 1300 returns to 1310 as described above.

Figure 13B:
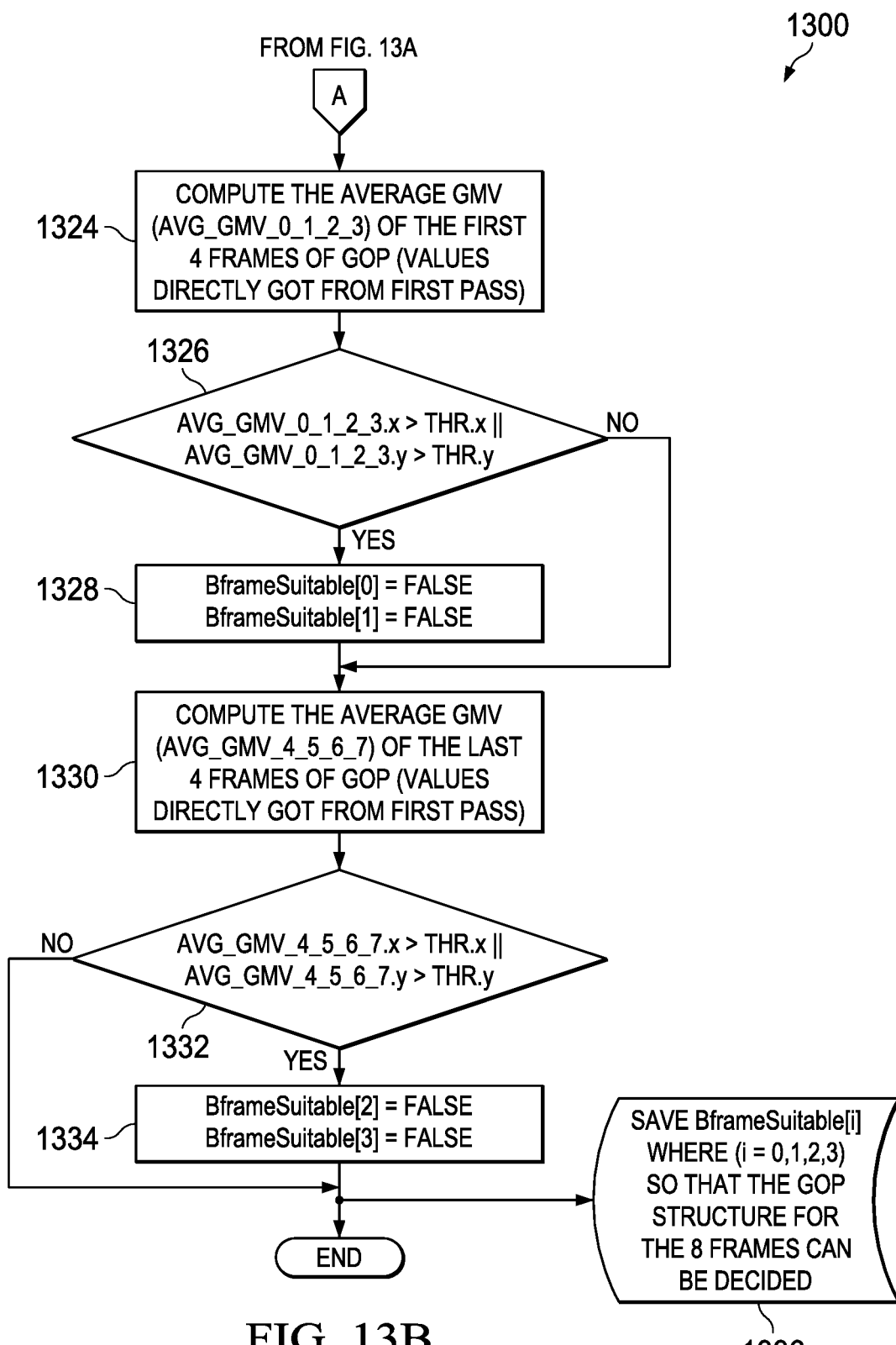

Once the index "i" has reached 4 (YES at 1322), the process 1300 proceeds to 1324 in FIG. 13B. At 1324, the encoder circuit 1504 computes the average global motion vector of the first 4 frames of the GOP (AVG_GMV_0_1_2_3) according to the values obtained from the first pass. At 1326, the encoder circuit determines whether the X direction average global motion vector value exceeds an X direction threshold THR.x or the Y direction average GMV value exceeds a Y direction threshold THR.y. If so (YES at 1326), the flags BFrameSuitableFlag[0] and BFrameSuitableFlag[1] for the first two pairs are set to False at 1328, and the process 1300 proceeds to 1330. If not (NO at 1326), the process 1300 proceeds directly to 1330, where the encoder circuit 1504 computes the average global motion vector value AVG_GMV_4_5_6_7 of the Final 4 frames. The X and Y direction values of the average global motion vector value AVG_GMV_4_5_6_7 are compared with the X and Y direction thresholds THR.x and THR.y at 1332, and if either threshold is exceeded (YES at 1332), the flags BFrameSuitableFlag[2] and BFrameSuitableFlag[3] for the final two frame pairs are set to False at 1334, and the process is completed and the B frame suitability flags BFrameSuitableFlag[i] are stored in the electronic memory 1506 (FIG. 15) at 1336 in FIG. 13B. If neither threshold is exceeded at 1332 (NO at 1332), the flags BFrameSuitableFlag[i] are stored at 1336 to complete the process 1300.

FIG. 14 shows examples of this processing by the encoder circuit 1504 using the flags BFrameSuitableFlag to determine SUB-GOP coding structure, including the SUB-GOP size value N. In these examples, for a given frame pair[n] (FIG. 12), if the BFrameSuitableFlag[n] is true, both frames of the pair[n] are marked as HB frames. If BFrameSuitableFlag[n] is false then both frames are marked as P frames. The frame coding types are scanned from left to right with the goal of using the largest possible HB SUB-GOP size for frames marked as B frames (Frames marked as P are always coded as P frames). After inserting largest possible HBSUB-GOP size, if more frames are left over in the SUB-GOP, the encoder circuit 1504 checks the remaining frames to determine the largest HBSUB-GOP size that can be used. This process may be performed iteratively until the encoder circuit 1504 reaches the end of the SUB-GOP.

FIG. 14 shows examples of how the SUB-GOP structure for a given set of 8 frames is decided based on the computed BFrameSuitableFlag values. Hierarchical coding with 'N' B frames is denoted as HBSUB-GOPN. HBSUB-GOPN will have N−1 number of B frames followed by a P frame in display order. The GOP size value of N will always be power of 2. Several non-limiting examples include the following:
 HBSUB-GOP4: BBBP,
 HBSUB-GOP8: BBBB BBBP, and
 HBSUB-GOP2: BP.

This solution derives certain frame level quantities or metrics from the macro block level information that is already generated during normal encoding, and thus no additional information is needed in order to implement the selective SUB-GOP size adjustment by the encoder circuit 1504. In addition, the SUB-GOP size determination is made at the frame or picture level using these frame level quantities, and thus the additional complexity of the proposed solution is small. Furthermore, this technique adaptively selects the SUB-GOP size N, and also decides the combination of different SUB-GOP sizes for a given maximum SUB-GOP size, which can be predetermined or set by a user in various examples. For example, using a maximum SUB-GOP size of 8, even if the encoder circuit 1504 selects smaller SUB-GOP sizes, it can select a combination of HBSUB-GOP4, HBSUB-GOP2, PP. The encoder circuit can thus dynamically determine the SUB-GOP size for a given time interval based on global motion offset and motion vector variance for better video compression efficiency. The solution allows the encoder circuit 1504 to adaptively select SUB-GOP size based on the characteristics of the video. Table 2 below shows several non-limiting examples of video quality improvements in terms of a video quality assessment methodology VQAM sequences. The VQAM sequences contain various video clips representing different real life scenarios.

TABLE 2

| No | Sequence name | BD-PSNR gain due to adaptive SUB-GOP selection algorithm (dB) | Equivalent bitrate reduction in % |
|---|---|---|---|
| 1 | sgoldendoor_p1920x1080_24fps_420pl_60fr | 0.37 | 7.39 |
| 2 | sfish_p1920x816_24fps_420pl_60fr | 0.19 | 7.61 |
| 3 | sparkjoy_p1920x1080_24fps_420pl_60fr | 0.11 | 2.95 |
| 4 | sfire_p1920x816_24fps_420pl_60fr | 0.10 | 2.37 |
| 5 | sfoolsgold_p1920x816_24fps_420pl_60fr | 0.09 | 1.89 |
| 6 | sviperpouringliquids_p1920x1080_24fps_420pl_30fr | 0.01 | 1.11 |
| 7 | sriverbed_p1920x1080_30fps_420pl_30fr | 0.01 | 0.25 |

The above examples are merely illustrative of several possible embodiments of various aspects of the present disclosure, wherein equivalent alterations and/or modifications will occur to others skilled in the art upon reading and understanding this specification and the annexed drawings. Modifications are possible in the described embodiments, and other embodiments are possible, within the scope of the claims.

What is claimed is:

1. A method of encoding a video stream, comprising:
   down sampling input video frames, the down sampling performed spatially in two directions;
   encoding the down sampled frames in a first encoding pass using IPP coding to generate a set of first pass coded frames forming a first pass group of pictures (GOP) including a single first pass intra coded frame (I frame) encoded independently of the other first pass coded frames, and a plurality of first pass predictive coded frames (P frames);
   generating first pass encoding statistics for individual first pass sub-groups of pictures (SUB-GOPs) of the first pass P frames; and
   encoding the input video frames in a second encoding pass to generate a set of second pass coded frames including a single second pass I frame encoded independently of the remaining second pass coded frames, the remaining second pass coded frames grouped as a plurality of second pass SUB-GOPs, the second pass SUB-GOPs individually including an integer number N of the remaining second pass coded frames, the second pass SUB-GOPs individually including at least one second pass P frame;
   wherein encoding the input video frames in the second encoding pass includes encoding the individual second pass SUB-GOPs according to the first pass encoding statistics generated for the corresponding first pass SUB-GOP of the first pass P frames;
   wherein generating the first pass encoding statistics for individual first pass SUB-GOPs of the first pass P frames includes computing an integer number N first pass mean motion vectors individually corresponding to the individual first pass P frames; and
   wherein encoding the input video frames in the second encoding pass includes:
   scaling the first pass mean motion vectors according to an amount of down sampling performed on the video frames of the video stream to generate scaled first pass mean motion vectors;
   for one or more individual second pass B frames of the individual second pass SUB-GOPs, computing a second pass mean motion vector according to the scaled first pass mean motion vectors for the first pass coded frames to which the individual B frames are referenced and any intervening first pass coded frames; and
   for the individual second pass P frames of the individual second pass SUB-GOPs, computing a second pass mean motion vector as a cumulative sum of the scaled first pass mean motion vectors for the first pass coded frames of the corresponding second pass SUB-GOP.

2. The method of claim 1, comprising starting the second encoding pass for a given SUB-GOP before the first encoding pass for a subsequent SUB-GOP.

3. The method of claim 2, wherein the first and second pass encoding of the first and second pass SUB-GOPs is done using a single encoder.

4. The method of claim 1, wherein the plurality of first pass P frames include motion-compensated difference information relative to a single one of the first pass coded frames.

5. The method of claim 1, wherein that the at least one second pass P frame includes motion-compensated difference information relative to a single other second pass coded frame.

6. The method of claim 1, wherein the first pass encoding statistics used in the second encoding pass include motion vector information associated with individual macro-blocks in the individual first pass coded frames used for multiple macro-blocks in the second encoding pass.

7. The method of claim 1, comprising using the scaled first pass motion vectors for motion estimation in the second encoding pass.

8. The method of claim 1, further comprising:
   scaling the first pass motion vectors according to an amount of down sampling performed on the video frames of the video stream to generate scaled first pass motion vectors; and
   using the scaled first pass motion vectors for motion estimation in the second encoding pass.

9. The method of claim 1,
   wherein encoding the down sampled frames in the first encoding pass includes determining if a new scene begins within a given first pass SUB-GOP; and
   wherein encoding the input video frames in the second encoding pass includes adjusting a boundary of a second pass SUB-GOP if a new scene is determined to begin in a corresponding first pass SUB-GOP.

10. The method of claim 1, comprising:
computing at least one metric for individual pairs of frames in the first encoding pass, the at least one metric for a given frame pair including one of:
an average intra macro-block count for the given frame pair, and
a motion vector variance for the given frame pair; and
determining a SUB-GOP coding structure including the number N of second pass frames for the second pass SUB-GOPs according to the at least one metric.

11. The method of claim 1, wherein the second pass SUB-GOPs individually include at least one second pass bipredictive coded frame (B frame) that includes motion-compensated difference information relative to two other second pass coded frames.

12. A system for encoding a video stream, comprising:
an electronic memory to store video frame data; and
a circuit configured to:
down sample input video frames, the circuit configured to down sample the video frames spatially in two directions;
encode the down sampled frames in a first encoding pass using IPP coding to generate a set of first pass coded frames forming a first pass group of pictures (GOP) including a single first pass intra coded frame (I frame) encoded independently of the other first pass coded frames, and a plurality of first pass predictive coded frames (P frames);
generate first pass encoding statistics for individual first pass sub-groups of pictures (SUB-GOPs) of the first pass P frames; and
encode the input video frames in a second encoding pass to generate a set of second pass coded frames including a single second pass I frame encoded independently of the remaining second pass coded frames, the remaining second pass coded frames grouped as a plurality of second pass SUB-GOPs, the second pass SUB-GOPs individually including an integer number N of the remaining second pass coded frames, the second pass SUB-GOPs individually including at least one second pass P frame;
wherein the circuit is configured to encode the individual second pass SUB-GOPs according to the first pass encoding statistics generated for the corresponding first pass SUB-GOP of the first pass P frames;
wherein the circuit is configured to generate the first pass encoding statistics for individual first pass SUB-GOPs of the first pass P frames by computing an integer number N first pass mean motion vectors individually corresponding to the individual first pass P frames; and
wherein the circuit is configured to encode the input video frames in the second encoding pass by:
scaling the first pass mean motion vectors according to an amount of down sampling performed on the video frames of the video stream to generate scaled first pass mean motion vectors;
for one or more individual second pass B frames of the individual second pass SUB-GOPs, computing a second pass mean motion vector according to the scaled first pass mean motion vectors for the first pass coded frames to which the individual B frames are referenced and any intervening first pass coded frames; and
for the individual second pass P frames of the individual second pass SUB-GOPs, computing a second pass mean motion vector as a cumulative sum of the scaled first pass mean motion vectors for the first pass coded frames of the corresponding second pass SUB-GOP.

13. The system of claim 12, wherein the circuit is configured to start the second encoding pass for a given SUB-GOP before the first encoding pass for a subsequent SUB-GOP.

14. The system of claim 13, wherein the circuit includes a single encoder to perform the first and second pass encoding of the first and second pass SUB-GOPs.

15. The system of claim 12, wherein the first pass encoding statistics used in the second encoding pass include motion vector information associated with individual macro-blocks in the individual first pass coded frames used for multiple macro-blocks in the second encoding pass.

16. The system of claim 12, wherein the circuit is configured to:
scale the first pass motion vectors according to an amount of down sampling performed on the video frames of the video stream to generate scaled first pass motion vectors; and
use the scaled first pass motion vectors for motion estimation in the second encoding pass.

17. The system of claim 12, wherein the circuit is configured to:
determine if a new scene begins within a given first pass SUB-GOP; and
adjust a boundary of a second pass SUB-GOP if a new scene is determined to begin in a corresponding first pass SUB-GOP.

18. The system of claim 12, wherein the circuit is configured to:
compute at least one metric for individual pairs of frames in the first encoding pass, the at least one metric for a given frame pair including one of:
an average intra macro-block count for the given frame pair, and
a motion vector variance for the given frame pair; and
determine a SUB-GOP coding structure including the number N of second pass frames for the second pass SUB-GOPs according to the at least one metric.

19. A non-transitory computer readable medium, comprising computer executable instructions for encoding a video stream, that when executed by a processor, cause the processor to:
down sample input video frames, the down sampling performed spatially in two directions;
encode the down sampled frames in a first encoding pass using IPP coding to generate a set of first pass coded frames forming a first pass group of pictures (GOP) including a single first pass intra coded frame (I frame) encoded independently of the other first pass coded frames, and a plurality of first pass predictive coded frames (P frames);
generate first pass encoding statistics for individual first pass sub-groups of pictures (SUB-GOPs) of the first pass P frames; and
encode the input video frames in a second encoding pass to generate a set of second pass coded frames including a single second pass I frame encoded independently of the remaining second pass coded frames, the remaining second pass coded frames grouped as a plurality of second pass SUB-GOPs, the second pass SUB-GOPs individually including an integer number N of the remaining second pass coded frames, the second pass SUB-GOPs individually including at least one second pass P frame;

wherein the computer executable instructions, when executed by a processor, cause the processor to encode the individual second pass SUB-GOPs in the second encoding pass according to the first pass encoding statistics generated for the corresponding first pass SUB-GOP of the first pass P frames;

wherein the computer executable instructions, when executed by a processor, cause the processor to generate the first pass encoding statistics for individual first pass SUB-GOPs of the first pass P frames by computing an integer number N first pass mean motion vectors individually corresponding to the individual first pass P frames; and wherein the computer executable instructions, when executed by a processor, cause the processor to encode the input video frames in the second encoding pass by:

scaling the first pass mean motion vectors according to an amount of down sampling performed on the video frames of the video stream to generate scaled first pass mean motion vectors;

for one or more individual second pass B frames of the individual second pass SUB-GOPs, computing a second pass mean motion vector according to the scaled first pass mean motion vectors for the first pass coded frames to which the individual B frames are referenced and any intervening first pass coded frames; and for the individual second pass P frames of the individual second pass SUB-GOPs, computing a second pass mean motion vector as a cumulative sum of the scaled first pass mean motion vectors for the first pass coded frames of the corresponding second pass SUB-GOP.

20. The method of claim 1, wherein the first pass encoding statistics used in the second encoding pass include:
(i) a position of a frame of the first pass SUB-GOP that forms a first picture of a new scene,
(ii) a count of intra coded macro-blocks in the individual first pass coded frames,
(iii) variance values computed separately in two directions of all motion vectors associated with the individual first pass coded frames,
(iv) a mean value of all motion vectors of the individual first pass coded frames, or
(v) a mode value of all motion vectors of the individual first pass coded frames.

21. The system of claim 12, wherein the first pass encoding statistics used in the second encoding pass include:
(i) a position of a frame of the first pass SUB-GOP that forms a first picture of a new scene,
(ii) a count of intra coded macro-blocks in the individual first pass coded frames,
(iii) variance values computed separately in the in two directions of all motion vectors associated with the individual first pass coded frames,
(iv) a mean value of all motion vectors of the individual first pass coded frames, or
(v) a mode value of all motion vectors of the individual first pass coded frames.

* * * * *